G. H. BOWEN.
THERMOSTATIC CIRCUIT CONTROLLER.
APPLICATION FILED JUNE 20, 1907.

903,165.  Patented Nov. 10, 1908.

Witnesses.
Inventor.

UNITED STATES PATENT OFFICE.

GEORGE H. BOWEN, OF BOSTON, MASSACHUSETTS.

THERMOSTATIC CIRCUIT-CONTROLLER.

No. 903,165.　　　Specification of Letters Patent.　　　Patented Nov. 10, 1908.

Application filed June 20, 1907. Serial No. 379,896.

*To all whom it may concern:*

Be it known that I, GEORGE H. BOWEN, a citizen of the United States, residing in Boston, in the county of Suffolk and State of Massachusetts, have invented an Improvement in Thermostatic Circuit-Controllers, of which the following description, in connection with the accompanying drawings, is a specification, like letters on the drawings representing like parts.

This invention relates to a thermostatic circuit controller and has for its object to provide a simple, efficient and reliable device, which is protected from external influences, as will be described. For this purpose, I employ an inclosing tube, preferably of glass, within which the operative parts of the circuit controller are located and preferably sealed against atmospheric influences, and also protected from injury by external forces or devices.

In the present instance, the invention is shown as embodied in a thermostatic circuit controller of the class used on open circuits, and in accordance with this invention, the movable member of the circuit controller is normally held out of contact with its coöperating member or members, by fusible material, which is supported within and by the inclosing tube, and which responds to external heat of a predetermined degree so as to permit the movable member to make contact with the coöperating member or members and close the electric circuit.

The thermostatic circuit controller is especially designed and adapted to be employed in automatic fire alarm service, among other uses.

These and other features of this invention will be pointed out in the claims at the end of this specification.

Figure 1:
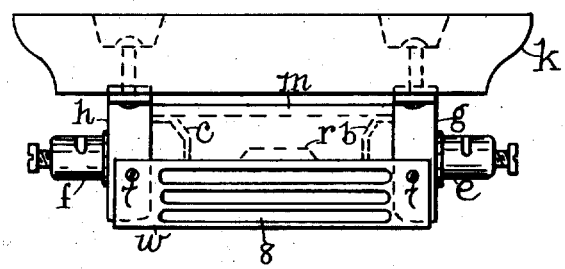
Figure 2:
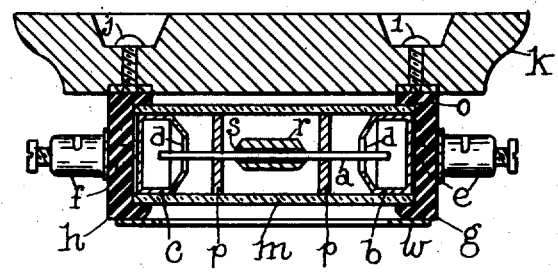
Figure 3:
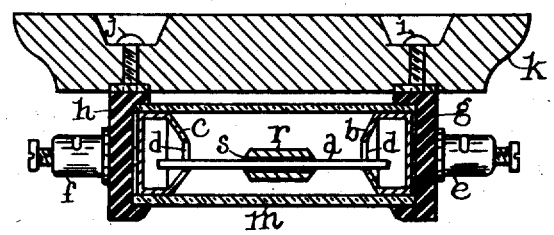
Figure 4:
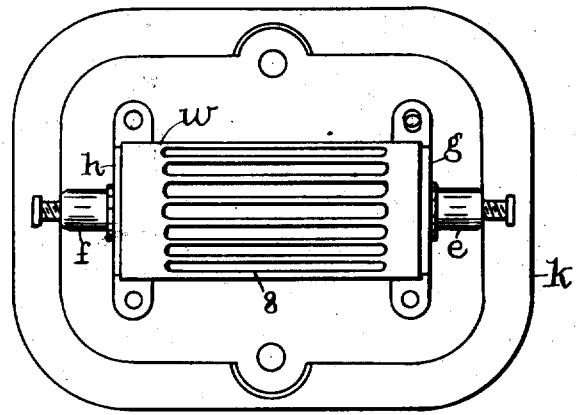

Figure 1 is an elevation of a thermostatic circuit controller embodying this invention. Fig. 2, a vertical longitudinal section of the circuit controller shown in Fig. 1, the same being shown in its open position. Fig. 3, a similar section of the circuit controller in its closed position, and Fig. 4, an inverted view of the circuit controller shown in Fig. 1.

In the present instance I have shown the invention as embodied in an open circuit thermostat, in which the movable member is shown as a rod $a$ of silver or other good conductor of electricity, which coöperates with two fixed members $b$, $c$, herein shown as hollow metal pieces having openings $d$ through which the ends of the rod $a$ are extended. The members $b$, $c$ are secured as by the binding screws $e$, $f$ to terminal blocks or pieces $g$, $h$, which are fastened as by the screws $i$, $j$ to a suitable base $k$.

The movable member $a$ is located in an inclosing tube $m$, preferably of glass, which is fitted over the fixed members $b$, $c$ and extended into sockets $n$ in the terminal blocks $g$, $h$, and is rendered air-tight or substantially so by suitable cement, indicated by the heavy black line $o$. The movable member $a$ is normally held out of engagement with the fixed members $b$, $c$ by means of a support of fusible material, such as fusible solder, which melts at a given or predetermined temperature. In the present instance the support for the member $a$, is shown as two disks $p$ of substantially the internal diameter of the tube $m$, which are strung upon the rod $a$.

The fusible support or disks $p$ rest upon the tube $m$ and normally hold the rod $a$ out of engagement with the members $b$, $c$, but when the temperature in the vicinity of the circuit controller reaches a predetermined point, the fusible support melts and allows the rod $a$ to drop and engage the members $b$, $c$, thereby closing the circuit in which the circuit controller is included.

The action of the thermostat may be quickened, by providing the rod or movable member $a$ with a weight $r$, preferably in the form of a metal sleeve, which is preferably separated from the rod $a$ by a sleeve or bushing $s$ of non-heat conducting material, so as to prevent the heat in the rod $a$ being transmitted to the metal weight $r$ and thereby tend to retard the transmission of heat from one fusible disk $p$ to the other.

The tube $m$ is preferably made of glass so that the condition of the members of the circuit controller may be seen at a glance and the said tube is preferably protected from being broken, or accidentally painted or whitewashed over, by a guard or shield, which may be made as a metal plate $w$, which is secured to the terminal blocks $g$, $h$ by screws 7 or otherwise, and which is provided with slots or openings 8 for the passage of heat.

In operation, the movable member or rod $a$ normally occupies the position shown in Fig. 2, but when the heat in the vicinity of the thermostatic circuit controller reaches a predetermined temperature, the fusible support for the rod $a$ melts, and permits the latter to drop down into engagement with the fixed members $b$, $c$ (see Fig. 3) and thereby close the circuit in which the circuit controller is located, such for instance as an automatic fire alarm circuit.

I have herein shown one construction of device embodying this invention, but I do not desire to limit my invention to the particular construction shown.

I may prefer to use the weight $r$ but it may be omitted, and the weight of the rod alone depended upon.

Claims—

1. The combination with a thermostatic circuit controller comprising a movable rod movable in a direction transversely of its length and circuit terminals with which it coöperates, of an inclosing tube for said rod extended over said terminals, and a fusible support for said rod located in said tube and normally engaging the inner surface of the same to hold the said rod out of contact with said terminals, substantially as described.

2. The combination with a thermostatic circuit controller comprising a movable rod movable in a direction transversely of its length, and circuit terminals with which it coöperates, of an inclosing tube for said rod extended over said terminals, a fusible support for said rod located in said tube and normally engaging the inner surface of the latter to hold the said rod out of contact with said terminals, supports for said circuit terminals, and a guard or shield for said tube secured to said supports, substantially as described.

3. The combination with a thermostatic circuit controller comprising a moveable member and fixed members with which said movable member coöperates and toward which said movable member moves in a direction substantially at right angles to the length of said movable member, of an inclosing tube for said movable member, and a fusible support for said movable member located within the tube and engaging its inner surface, substantially as described.

4. The combination with a thermostatic circuit controller provided with a movable member movable in a direction transversely of its length, of a tube inclosing said member, fusible material within said tube normally supporting said movable member, and circuit terminals with which said movable member coöperates, substantially as described.

5. The combination with a thermostatic circuit controller provided with fixed members and with a movable member normally out of contact therewith and movable in a direction transversely of its length, a fusible support for said movable member, and a glass tube inclosing said movable member and sustaining said fusible support.

6. The combination with a thermostatic circuit controller provided with circuit terminals, and with a movable member coöperating with said circuit terminals and movable transversely of its length, of a tube inclosing said movable member, fusible material within said tube normally supporting said movable member, and means to close the ends of said tube, substantially as described.

7. The combination with a thermostatic circuit controller provided with a movable member bodily movable in a direction transversely of its length, of a glass tube inclosing said movable member, fusible material supporting said movable member within said tube, and circuit terminals extended into the opposite ends of said tube and with which said movable member coöperates, substantially as described.

8. The combination with a thermostatic circuit controller provided with a movable member movable in a direction transversely of its length, a tube inclosing said member, means to close the ends of said tube, and fixed terminal members carried by said means and coöperating with said movable member, and fusible material within the said tube normally supporting said member, substantially as described.

In testimony whereof, I have signed my name to this specification in the presence of two subscribing witnesses.

GEORGE H. BOWEN.

Witnesses:
 JAS. H. CHURCHILL,
 J. MURPHY.